United States Patent [19]

Jerina et al.

[11] Patent Number: 5,439,276
[45] Date of Patent: Aug. 8, 1995

[54] TAMPER-RESISTANT INDEPENDENT BRAKE VALVE DEVICE FOR LOCOMOTIVE AIR BRAKE EQUIPMENT

[75] Inventors: Frank J. Jerina, Irwin; Michael E. Romansky, North Huntingdon; Dale A. Chovan, Trafford, all of Pa.

[73] Assignee: Westinghouse Air Brake Company, Wilmerding, Pa.

[21] Appl. No.: 128,966

[22] Filed: Sep. 30, 1993

[51] Int. Cl.6 .............................. B60T 15/04
[52] U.S. Cl. ..................... 303/56; 137/797; 137/868; 303/50; 303/1; 188/151 A
[58] Field of Search ................... 303/50–56, 303/79, 86, 1; 137/797, 868; 251/263, 337; 188/151 A

[56] References Cited

U.S. PATENT DOCUMENTS

| | | |
|---|---|---|
| 2,958,561 | 11/1960 | May . |
| 3,272,565 | 9/1966 | Wilson . |
| 4,095,713 | 6/1978 | Norton . |
| 4,272,458 | 6/1981 | Ruth et al. . |
| 4,273,730 | 6/1981 | Byrnes, Jr. . |
| 4,526,194 | 7/1985 | Miller ........................ 137/797 |
| 4,718,828 | 1/1988 | Breeck et al. . |
| 5,000,222 | 3/1991 | Moenkhaus et al. . |

Primary Examiner—Douglas C. Butler
Attorney, Agent, or Firm—John B. Sotak

[57] ABSTRACT

A tamper-resistant independent brake valve device for use in a brake equipment on railway locomotives including a main body casing carrying a movable handle, a rotatable cam, a pivotal cam dog and an exhaust and supply valve assembly, a spring housing attached to the main body casing by a plurality of one-way screws, a break-away adjusting screw for setting the maximum brake cylinder pressure on the railway locomotive, the pivotal cam dog including an enlarged head portion to preclude the insertion of a prying tool, and the pivotal cam dog having cam engaging roller which is rotated on a round head roller pin.

8 Claims, 3 Drawing Sheets

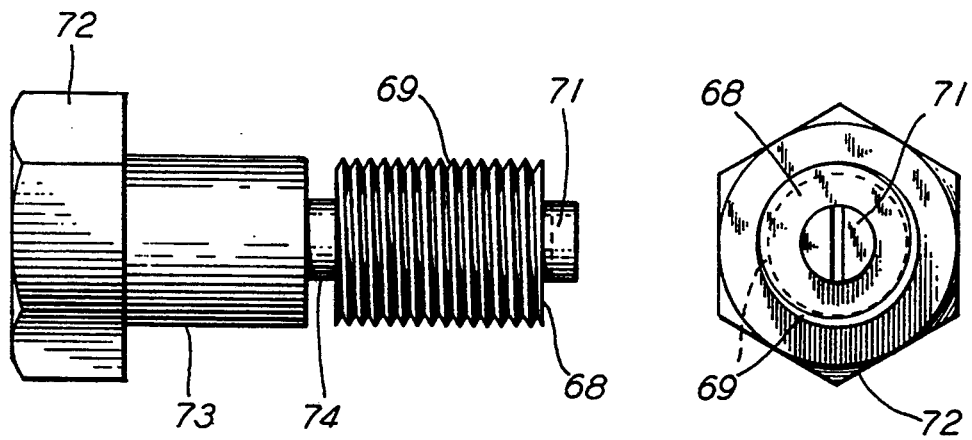
FIG. 3
FIG. 5
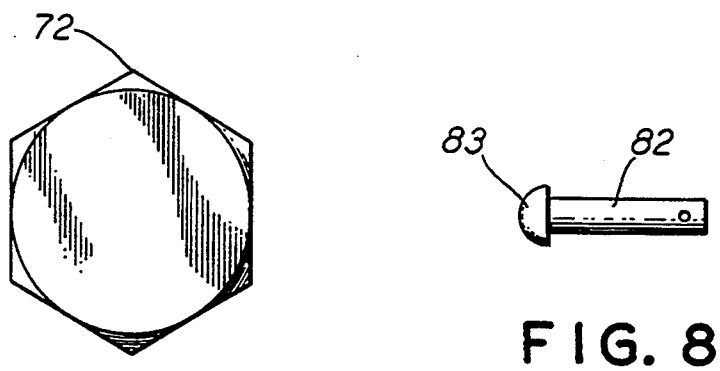
FIG. 4
FIG. 8
FIG. 6
PRIOR ART
FIG. 7
PRIOR ART

TAMPER-RESISTANT INDEPENDENT BRAKE VALVE DEVICE FOR LOCOMOTIVE AIR BRAKE EQUIPMENT

FIELD OF THE INVENTION

This invention relates to an improved manually operated independent brake valve structure for preventing a locomotive operator from modifying and increasing the preset brake cylinder pressure on a locomotive by employing a new cam dog design which precludes the insertion of a lever device and a round head roller pin which removes a previous prying location for preventing the opening of an inlet valve unit, and utilizing a breakaway adjusting screw as well as using a plurality of tamper-resistant screws for attaching an improved entry resistive spring house to the valve body to prevent unauthorized changing of the tension of a preset adjusting spring.

BACKGROUND OF THE INVENTION

It will be appreciated that air brake systems on modern railway locomotive vehicles may be generally of the type shown and disclosed in U.S. Pat. Nos. 2,958,561 and 3,272,565, which are both assigned to the assignee of the present application. Normally, the fluid pressure brake control system of a direct release type is provided for a freight locomotive including a pipe bracket mounting having a manually operable automatic brake valve device connected thereto on one side for controlling the fluid brake pressure in a train pipe and, in turn, the brakes on the locomotive and the trailing freight cars, and having a manually operable independent brake valve device connected thereto on another side for controlling the brakes on the locomotive independent of the brakes on the freight cars in a train. In an SA-26 independent brake valve device which is a small capacity, self-lapping diaphragm-operated type regulating valve, an air supply pressure is delivered to the brake cylinders at a preset controlled rate. The level of the delivery pressure is determined by the spring tension of an adjustable spring. That is, the control spring is adjusted to a specific value that is predicated in the yard or main line operating instructions established by each given railroad. In the past, manual adjustment of the delivery pressure was made by turning a slotted or socket adjusting screw mounted on the end of the control spring housing which was bolted to the valve body. If a high pressure is desired, the compression on the spring is increased so that a higher delivery pressure would be required to lap the valve. Conversely, if a lower pressure is desired, the compression on the spring is decreased so that a lower delivery pressure would be required to lap the valve. The independent brake valve control handle has two positions, namely, a release position located at one extreme end of a quadrant and a full application position located at the other extreme end of the quadrant. It will be appreciated that located between the release and full application is an application zone or sector. The more the handle is moved toward the full application position, the greater will be the application pressure. When the independent brake valve control handle is moved from the release position toward the full application position, a progressive cam effectively rotates a pivotal dog which causes the depression of a thimble member. The movement of the thimble member operates a supply and exhaust valve assembly which first seats the exhaust valve and then unseats the supply valve. Accordingly, the pressurized air from the main reservoir will flow through the unseated supply to the delivery port. The delivery port is connected to a control port of a relay valve. As air pressure develops in the delivery port, it also builds up on the inner surface of the diaphragm in the independent brake valve. The build-up of pressure on the inner surface of the diaphragm is opposed by the preset spring force exerted on the opposite side of the diaphragm. When the air pressure and the spring force become balanced, the valve assembly will move to its lap position in which the supply valve becomes seated so that further air flow from the main reservoir to the delivery port is terminated. Now if there is leakage in the line of the delivery port, the air pressure will drop so that the diaphragm assembly will move and cause the supply valve to be unseated. Thus, the main reservoir is permitted to restore the air pressure in the delivery port to the valve of the spring setting. It has been found that an engineer or trainman may deliberately circumvent the normal operation of the present SA-26 independent brake valve and may increase the brake cylinder pressure applied on the locomotive consist by overriding the preset spring force.

OBJECTS AND SUMMARY OF THE INVENTION

Accordingly, it is an object of this invention to provide an improved independent brake valve which will prevent a locomotive operator from modifying the preset maximum braking effort on a locomotive.

A further object of this invention is to provide an improved independent brake valve structure which precludes a trainman from deliberately altering the preset braking pressure on a locomotive.

Another object of this invention is to provide a uniquely designed independent brake valve for thwarting an engineman from intentionally increasing the preset brake cylinder pressure on a locomotive consist.

Yet another object of this invention is to provide an independent brake valve device which is structurally designed to preclude a locomotive engineer from changing the pre-established maximum brake cylinder pressure.

Yet a further object of this invention is to provide a tamper-resistant independent brake valve device which prevents operating personnel from raising the maximum brake cylinder pressure on a railway locomotive.

Still another object of this invention is to provide a tamper-resistant independent brake valve for railway locomotives comprising a valve body portion having an operating handle carried by said valve body portion for rotating a cam member, a follower member moved by the rotatable cam member, a valve assembly having a supply and exhaust valve opened and closed by the follower member, a spring housing fixedly attached to the valve body portion by a plurality of security fasteners, an adjustable spring disposed within the spring housing, and an adjusting screw for permitting a compression spring to be adjusted during testing to establish a maximum brake cylinder pressure and to subsequently prevent operating personnel from increasing the maximum brake cylinder pressure.

Still a further object of this invention is to provide an improved tamper-resistant independent brake valve device which is simple in design, efficient in operation, economical in cost, reliable in use, durable in service, unique in construction, and effective to use.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 3 is an enlarged plan view of the break-away spring tension adjusting screw for the brake valve device of FIG. 2.

FIG. 4 is an elevational end view of the head of the adjusting screw of FIG. 3.

FIG. 5 is an elevational end view of the adjusting screw as viewed from the threaded end.

FIG. 6 is an enlarged plan view of a tamper-proof screw which may by utilized in securing the spring housing to the valve body.

FIG. 7 is an elevational end view of the round head of the tamper-proof screw of FIG. 6.

FIG. 8 is an enlarged plan view of a cam dog pivot pin employed in the independent brake valve device of FIG. 2.

DETAILED DESCRIPTION OF THE INVENTION

Figure 1:
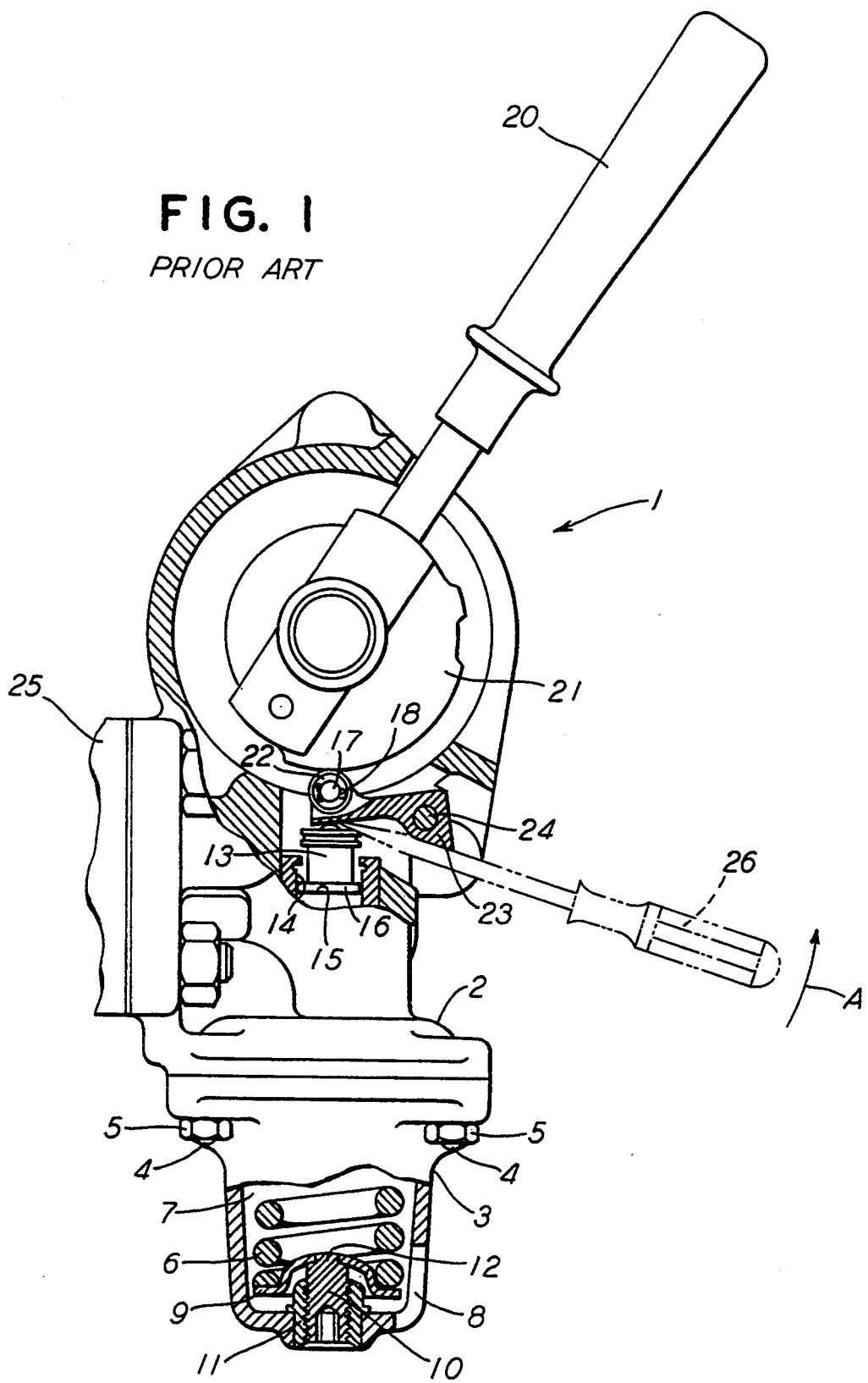
FIG. 1 is a partial cross-sectional view of a conventional manually controllable independent brake valve device illustrating one method of tampering by an operator of a railway train.

Referring now to the drawings, and in particular to FIG. 1, there is shown an existing SA-26 manually operative self-lapping type independent brake valve portion 1 which is presently employed in locomotive air brake equipment for controlling the locomotive brake cylinder pressure irrespective of the position of the automatic brake valve handle on a railway train. The independent brake valve device 1 includes a self-lapping valve portion and a pressure responsive diaphragm assembly (not shown). The outer periphery of the diaphragm is clamped between the bottom of the valve body casing 2 and a spring housing or casing 3 which is secured to the body case 2 by studs 4 and hex nuts 5. The diaphragm assembly is subject opposingly to pressure fluid in a pressure chamber located above the diaphragm and to pressure of a biasing spring 6 located in chamber 7. The spring chamber 7 is vented to atmosphere via a substantially large opening 8 located in the lower side of the spring housing 3. A spring seat 9 engages the lower end of the biasing spring 6. The tension on the spring can be varied by means of turning a socket-head type of adjusting screw 10 that is screw-threaded engagement with a female member 11 located in the bottom end of the housing 3. The adjusting screw 10 is provided with a reduced portion 12 which extends through a central aperture formed in the spring seat 9 and may be secured thereto as by riveting. If a high pressure is desired, the compression on the spring 6 is increased so that a higher delivery pressure will be required to lap the valve portion. Conversely, if a lower pressure is desired, the compression of spring 6 is decreased so that a lower delivery pressure will be required to lap the valve portion. It will be seen that a cup-shaped piston member 13 is slidably mounted in a counterbore 14 formed in the valve body 2. The piston member 13 includes a peripheral annular groove 15 in which is disposed an O-ring seal 16 that forms a seal with the wall surface of the counterbore 14.

It will be noted that the independent brake valve device 1 includes an operating handle 20 which is arcuately rotated from inoperative or released position to a full application position, as shown in FIG. 1. The movement of the operating handle 20 by the engineer or trainman from the release position toward the full application position actuates a rotatable cam 21 which, in turn, positions a supply and exhaust valve assembly. In practice, the peripheral surface of the rotatable cam 21 engages a cam roller 22 which rotates about pin 17 which is mounted on the inner end of a pivotal cam dog 23. The rotary pin is retained in a through hole by a pair of cotter pins 18 inserted in the respective ends thereof. As shown, the outer end of the cam dog 23 is pivoted about a suitable pin 24 with the remote inner underside thereof engaging a wear pin 19 inserted in the top of the piston member 13. It will be appreciated that rotation of the handle 20 and cam 21 toward the application zone initially seats an exhaust valve and then unseats a supply valve. Thus, the main reservoir pressure will then flow past the unseated supply valve from a supply port to a delivery port in the pipe bracket 25. As the air pressure builds up in the delivery port, it also builds up on the inner face of the diaphragm in the independent brake valve device 1. The buildup of air pressure on the diaphragm is opposed by the spring pressure on the opposite side. When the air pressure and the spring pressure become balanced, the valve assembly will be moved to its lap position in which the supply valve becomes seated to shut off the flow of air from the main reservoir to the delivery port. Now if the air pressure in the delivery line is reduced due to leakage, the diaphragm assembly will be moved again to unseat the supply valve which will permit the main reservoir to restore the air pressure in the delivery port of the valve to the spring setting. It has been found that a significant cost in locomotive maintenance is caused by the need to true the wheels in order to remove the flat spots which are due to sliding. One of the main causes of flat stops on the wheels of locomotives is due to the tampering of the independent brake valve by engineers which can result in an undue increase of the brake cylinder pressure. As illustrated in FIG. 1, one previous method of increasing the brake cylinder pressure is by inserting and placing a prying tool, such as a flat screw driver 26, or the like, under the cam dog 23 and rotating it in a counterclockwise direction as depicted by arrow A to depress the piston member 13 and increase the brake cylinder pressure. Another method employed by the trainman was to insert a prying tool into opening 8. The tip of the prying device was placed under spring seat 9 to compress and increase the tension of the biasing spring 6. A further method of increasing the brake cylinder pressure was compressing the spring 6 by placing a shim between the valve seat and the end of the spring. In some cases, the engineer would remove the spring housing 3 by unscrewing the conventional hex nuts 5 and then he would place a shim, such as a washer or the like, between the end of the spring and the spring seat after which he would reassemble the spring housing and re-tighten the hex nuts 5. In addition, it was discovered that another prying location was available to the engineer. Access to the cam dog roller pin 19 and its cotter pin could cause rotation of the cam dog 23, and depression of the piston member 13. Accordingly, it is necessary to attempt to preclude tampering so as to prevent unwarranted increase of the brake cylinder pressure on the locomotive.

Figure 2:
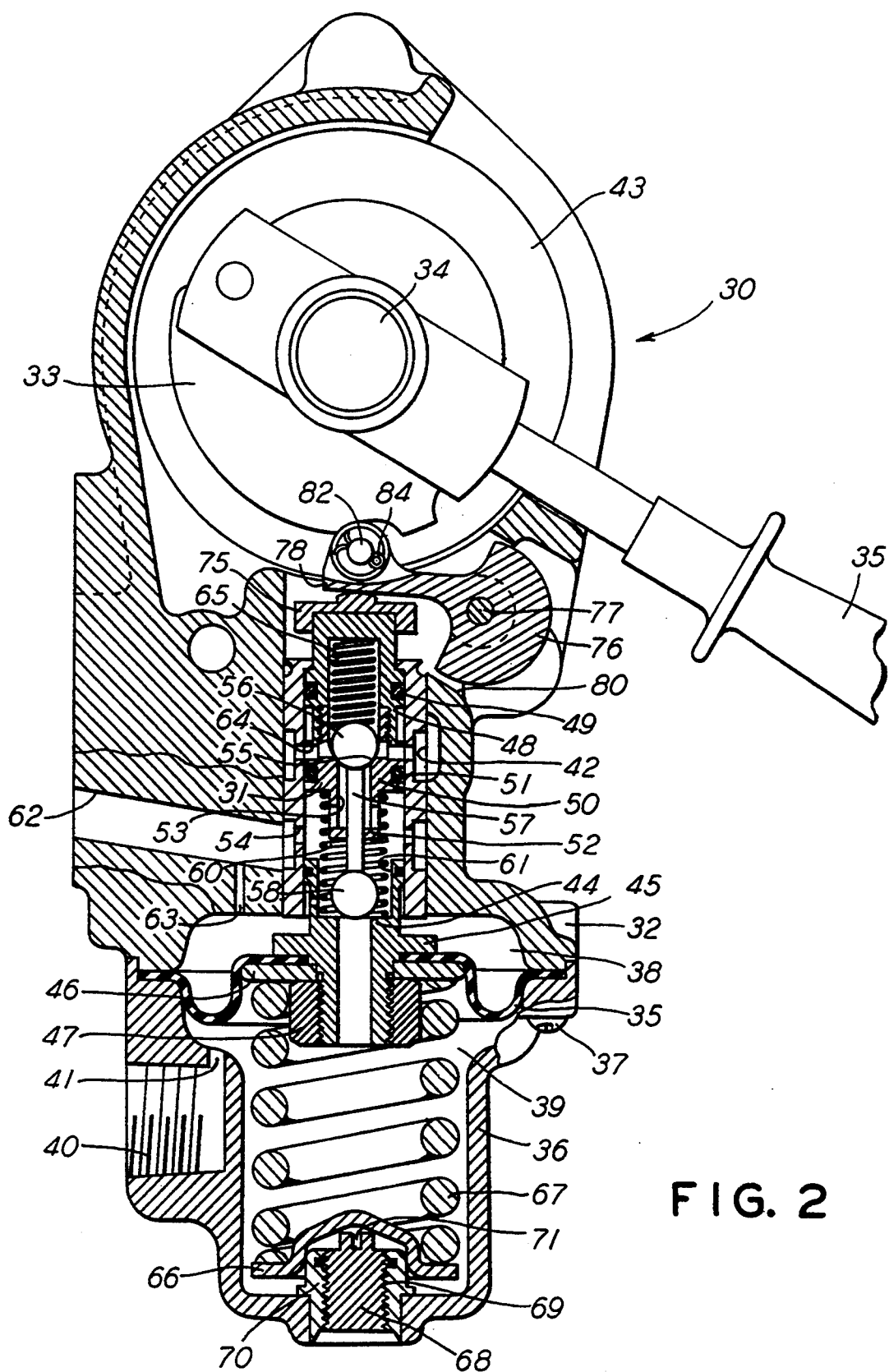
FIG. 2 is a cross-sectional view of the presently improved manually controllable independent brake valve device with the operating handle in the full release position.

Referring now to FIG. 2, it will be seen that the independent brake valve device 30 has been renovated to minimize tampering by the train operator. In viewing FIG. 2, it will be noted that the independent brake valve device 30 includes a self-lapping valve unit or assembly 31 centrally disposed in the body housing 32. The self-lapping valve portion 31 is manually controlled by a cam member 33 which is secured to a rotatable cam shaft 34. It will be seen that the rotation of the cam shaft 34 and cam member 33 is effected by arcuately moving a brake valve handle 35 by which the trainman or engineer on the lead locomotive may control the desired independent braking effort.

The contour of the cam 33 is such that rotation of the handle 35 of the operating handle 35 in one direction out of the normal release position through an application zone to a full application position causes the cam 33 to effect operation of the self-lapping valve portion 32.

The self-lapping valve portion 32 of the independent brake valve device 30 includes a flexible diaphragm assembly. The outer periphery of a flexible diaphragm 35 is clamped between the bottom of the body housing or casing 32 and the top of the spring housing or casing 36 which is securely attached to the body casing 32 by a plurality of security or tamper-proof screws, one of which is depicted by numeral 37. As shown in FIGS. 6 and 7, the round head one-way screws 37 can be installed with an ordinary slotted or flat screwdriver but cannot be removed by using conventional tools. The diaphragm 35 cooperates with the body casing 32 and the spring housing 36 to form on opposite sides of the diaphragm a pair of chambers 38 and 39. The chamber 39 is vented or opened to atmosphere via an outer threaded opening 40 which is in communication with a smaller inner lateral opening 41 which prevent the insert of prying tools.

The body casing 32 of the self-lapping type independent brake valve device 30 is provided with a bore 42 which communicates with the space 43. The bore 42 also extends into the chamber 38 above the diaphragm 35. Slidably mounted in the lower end of the bore 42 is an exhaust valve seat member 44 on the lower end of which is formed a diaphragm follower 45 that abuts the upper side of the diaphragm 35 and has a screw-threaded stem that extends through the diaphragm 35 and a second diaphragm follower 46 that abuts the lower side of the diaphragm 35 and receives a nut 47 which operatively connects the center of the diaphragm 35 to the diaphragm followers 45 and 46.

Slidably mounted in the bore 42 is a cup-shaped piston member 48 having a peripheral annular groove in which is disposed an 0-ring seal 49 that forms a seal with the wall surface of the counterbore 42. The lower end of the cut-shaped piston member 48 is provided with an internally-threaded counterbore that has screw-threaded engagement with external screw threads formed on the upper end of a second cup-shaped piston member 50 that is slidably mounted in the bore 42 and is provided with a peripheral annular groove in which is disposed an O-ring seal 51 that also forms a seal with the wall surface of the counterbore 42. The second cup-shaped piston member 50 is provided with a bore 52, a coaxial counterbore 53, and a crosswise bore 54 that connects the interior of the counterbore 53 to a delivery chamber 54 formed within the counterbore 42 between the second cup-shaped piston member 50 and the exhaust valve seat member 44. Formed at the upper end of the counterbore 53 is an annular supply valve seat 55 against which a ball type supply valve 56 is normally biased by a spring 52 that is interposed between the supply valve 56 and the cup-shaped piston member 48. The supply valve 56 is connected to one end of a stem 57 that extends through the counterbore 53 and bore 52, and at its lower end is secured to a ball type exhaust valve 58. The exhaust valve 58 is normally biased out of seating contact with the annular exhaust valve seat member 51 by a spring 60 that is interposed between the lower side of the second cup-shaped piston member 50 and the bottom of the counterbore 61. Opening into the delivery chamber 54 is one end of a passageway 62 that extends through the spring casing section 37. The passageway 62 is connected to the chamber 38 above the diaphragm 35 via a choke or metered port 63 so that, while the supply valve 56 is unseated from the annular valve seat 55, in a manner hereinafter described in detail, to effect the supply of fluid under pressure to the delivery chamber 54, this fluid under pressure will flow to the chamber 38 above the diaphragm 35 at a rate controlled by the size of the choke 63.

It will be appreciated that fluid under pressure flows from a main reservoir via pipe #5 (not shown), counterbore 42, and a crosswise bore 64 in the cup-shaped portion of the second cup-shaped piston member 50 to a supply valve chamber 65 formed in the cup-shaped piston member 48.

Interposed between the diaphragm follower 46 and a spring seat 66 is a diaphragm spring 67 that is effective to bias the diaphragm 35 and the exhaust valve seat member 44 in the direction of the ball type exhaust valve 58. The tension of the diaphragm spring 67 can be initially varied by means of a break-away case-hardened type spring adjusting screw 68 that has a screw-threaded portion 69 in engagement with a female threaded member 70 carried by the spring housing 36 and is provided with a slotted reduced portion 71 that engages the spring seat 66. In viewing FIGS. 3, 4, and 5, it will be seen that the spring adjusting screw 68 includes a hex head portion 72, an enlarged non-threaded portion 73, and a reduced intermediate portion 74. The desired delivery pressure is set by placing a suitable wrench or the like on the hex head 72 and turning the adjusting screw 68 until the proper spring tension is reached. After the adjustment is made, the head 72 and enlarged portion 73 are broken away by snapping off the reduced portion 74 so that the threaded portion 69 may not be turned to increase the brake cylinder pressure. Normally, the maximum stress point of the reduced portion 74 of screw 68 is located near the surface of the threaded portion 69 so that a clean break occurs in this area. The slot in the end of the reduced portion 71 allows the screw to be removed from the female thread member 70 when the spring housing 36 is detached from the valve casing 32.

In some cases, a thimble wear member 75 is placed on the end of the piston member 48. As shown in FIG. 2, the underside of an inner leg 78 of the pivoted cam dog 76 rests against the top of the thimble 75. It will be seen that the cam dog 76 is rotatable about a pivot pin 77 by the cam member 33 when the operating handle 35 is moved between its depicted release position as shown in FIG. 2 to its full application position, as illustrated in FIG. 1. It will be noted that the outer portion 79 of the cam dog 76 has been redesigned and enlarged to prevent the insertion of any prying tool. The cross-section of the outer portion 79 now takes the form of substantially a half or a semi-circle cross-section in which arcuate section effectively covers the opening 80.

In addition, it will be noted that the upper inner extremity of the leg 78 carries a cam roller which is rotatable about apertured pivot pin 82 having a round head 83 at one end and a cotterway formed on the other end as shown in FIG. 8. A cotter pin 84 holds the pivot pin 82 in place as shown in FIG. 2. The round head 83 removes a prying location which was available with the pivot pin and the two-cotter-pin arrangement of the prior art independent brake valve device of FIG. 1.

Thus, the present invention provides a tamper-resistant, independent brake valve device which minimizes the ability of operating personnel from increasing the brake cylinder pressure beyond the maximum preset value.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. A tamper-resistant independent brake valve for railway locomotives comprising a valve body portion, an operating handle carried by said valve body portion for rotating a cam member, a follower member moved by said rotatable cam member, a valve assembly having a supply and exhaust valve opened and closed by said follower member, a spring housing fixedly attached to said valve body portion by a plurality of one-way security fasteners, an adjustable spring disposed within said spring housing, and an adjusting screw for permitting a compression spring to be adjusted during testing to establish a maximum brake cylinder pressure and to subsequently prevent operating personnel from increasing the maximum brake cylinder pressure, wherein said follower member is pivoted about an end remote from said cam member and is designed to preclude the insertion of a prying instrument, wherein said spring housing includes an opening which is vented to atmosphere, but which prevents the altering of compressive force of said compression spring, and wherein said adjusting screw includes a break-away portion which is detached after said adjusting screw is appropriately adjusted.

2. The tamper-resistant independent brake valve for railway locomotives as defined in claim 1, wherein the remote end of said follower member is adapted to prevent the maximum brake cylinder pressure from being increased by holding said supply valve in its opened position.

3. The tamper-resistant independent brake valve for railway locomotives as defined in claim 1, wherein said follower member includes a cam roller which engages the surface of said cam member.

4. The tamper-resistant independent brake valve for railway locomotives as defined in claim 3, wherein said cam roller is rotatably mounted on a round headed pivot pin which is not readily susceptible for allowing said cam member to be rotated by a prying instrument.

5. The tamper-resistant independent brake valve for railway locomotives as defined in claim 1, wherein said opening includes outer threaded passageway and an inner lateral passageway.

6. The tamper-resistant independent brake valve for railway locomotives as defined in claim 1, wherein said remote end of said follower member takes the form of semi-circle cross-section.

7. A manually controllable tamper-resistant independent brake valve device comprising a body casing, a control handle rotatably connected to said body casing, a rotatable cam operated by said control handle, a cam dog operated by said rotatable cam, a valve unit operated by said cam dog for initially closing an exhaust valve and for subsequently opening a supply as said control handle is moved into an application zone, a diaphragm assembly having its inner periphery connected to said valve unit and having its outer periphery clamped between the bottom of said body casing and the top of a spring casing which is secured to said body casing by a plurality of tamper-resistant fasteners and a compression spring being adjusted to a desired level of brake cylinder pressure by a break-away adjusting screw which precludes readjustment of said compression spring wherein said spring casing is vented to atmosphere via an outer threaded opening and inner lateral opening such that the altering of compressive force of said compression spring is prevented and wherein said cam dog includes an enlarged head portion which prevents insertion of a prying tool.

8. The manually controllable tamper-resistant independent brake valve device as defined in claim 7, wherein said cam dog includes a cam roller which is rotatably supported by a round head pin.

* * * * *